United States Patent
Peng et al.

(10) Patent No.: US 11,012,341 B2
(45) Date of Patent: May 18, 2021

(54) METHOD FOR MONITORING AND CONTROLLING SESSION TRAFFIC USAGE, SERVER AND STORAGE MEDIUM

(71) Applicant: ZTE CORPORATION, Guangdong (CN)

(72) Inventors: Jian Peng, Guangdong (CN); Xiaoyun Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/643,423

(22) PCT Filed: Aug. 30, 2018

(86) PCT No.: PCT/CN2018/103240
§ 371 (c)(1),
(2) Date: Feb. 28, 2020

(87) PCT Pub. No.: WO2019/042351
PCT Pub. Date: Mar. 7, 2019

(65) Prior Publication Data
US 2020/0195543 A1   Jun. 18, 2020

(30) Foreign Application Priority Data
Aug. 30, 2017   (CN) .......................... 201710763672.1

(51) Int. Cl.
*H04L 12/24*   (2006.01)
*H04L 29/08*   (2006.01)
(Continued)

(52) U.S. Cl.
CPC .......... *H04L 43/16* (2013.01); *H04L 12/2876* (2013.01); *H04L 43/062* (2013.01);
(Continued)

(58) Field of Classification Search
None
See application file for complete search history.

(56) References Cited

U.S. PATENT DOCUMENTS

| | | | |
|---|---|---|---|
| 9,154,314 B2 | 10/2015 | Zhou et al. | |
| 2015/0341851 A1* | 11/2015 | Cai | H04M 15/66 455/434 |
| 2018/0097700 A1* | 4/2018 | Navas Cornejo | H04L 12/1407 |

FOREIGN PATENT DOCUMENTS

| | | |
|---|---|---|
| CN | 102075900 A | 5/2011 |
| CN | 102612084 A | 7/2012 |
| CN | 102904740 A | 1/2013 |

OTHER PUBLICATIONS

China Patent Office, First Office Action (OA1) dated Dec. 3, 2020 regarding China patent application No. CN201710763672.1.
(Continued)

*Primary Examiner* — Natisha D Cox
(74) *Attorney, Agent, or Firm* — Houtteman Law LLC (57) ABSTRACT

A method for monitoring and controlling session traffic usage, includes: receiving traffic usage increment information of a first session and a second session reported by a first PCF and a second PCF; accumulating a total traffic usage of the first session and the second session according to the received traffic usage increment information; determining whether a current total traffic usage reaches a threshold value of a total issued traffic usage; and sending the total traffic usage information of the first session and the second session to the first PCF and the second PCF in response to that the current total traffic usage reaches the threshold value of the total issued traffic usage, and in response to that the current total traffic usage does not reach the threshold value of the total issued traffic usage, repeating above steps.

11 Claims, 5 Drawing Sheets

(51) Int. Cl.
*H04L 12/26* (2006.01)
*H04L 12/28* (2006.01)

(52) U.S. Cl.
CPC .......... *H04L 43/0882* (2013.01); *H04L 67/14* (2013.01); *H04L 67/26* (2013.01)

(56) References Cited

OTHER PUBLICATIONS

3GPP, "Policy and Charging Control Architecture" dated Jun. 12, 2017, 3GPP TS23.203.

* cited by examiner

METHOD FOR MONITORING AND CONTROLLING SESSION TRAFFIC USAGE, SERVER AND STORAGE MEDIUM

CROSS-REFERENCE TO RELATED APPLICATIONS

The present application is a National Phase Application filed under 35 U.S.C. 371 as a national stage of PCT/CN2018/103240, filed on Aug. 30, 2018, an application claiming priority from Chinese patent application No. 201710763672.1 entitled "method for monitoring and controlling session traffic usage, server and storage medium" filed on Aug. 30, 2017, the contents of which are incorporated herein by reference in their entirety.

TECHNICAL FIELD

The present disclosure relates to, but not limited to, the field of communication technology, and in particular, to a method for monitoring and controlling session traffic usage, a server and a storage medium.

BACKGROUND

With the development of communication technology, mobile communication technology has evolved into the fifth generation, i.e., 5G. The Policy Control Function (PCF) serves as a policy center, and is used for Quality of Service (QoS) control, charging control, access and mobility management function control, routing policy control, access network discovery and selection policy control, and the like.

Many operators require the PCF to perform session traffic management to perform policy control based on a total amount of session traffic usage of a user. In such case, the PCF needs to have a session traffic usage monitoring function, and can monitor the session traffic usage of the user in real time and control the session traffic usage of the user according to a charging mechanism. When a Protocol Data Unit (PDU) session is established, the PCF sets and issues a threshold (duration and/or traffic threshold) to a Session Management Function (SMF) to monitor the session traffic usage, thereby formulating a QoS policy. When the threshold is reached or the PDU session is ended, the SMF reports the session traffic usage to the PCF. When the last PDU session of the User is terminated, the PCF reports accumulated session traffic usage information to a User Data Repository (UDR) for storage.

However, the session traffic usage monitoring function implemented by the PCF may summarize the total amount of session traffic usage for the user only when the user distributes all PDU sessions to a same PCF, and perform policy control accordingly. If the user distributes the PDU sessions to a plurality of PCFs, the total amount of the session traffic usage of the user cannot be obtained through the session traffic usage monitoring function realized by the PCF, and therefore the policy control cannot be carried out timely and correctly.

SUMMARY

The present disclosure provides a method for monitoring and controlling session traffic usage, including steps of: receiving traffic usage increment information of a first session and traffic usage increment information of a second session reported by a first policy control function and a second policy control function; accumulating a total traffic usage of the first session and the second session according to the received traffic usage increment information; determining whether a current total traffic usage reaches a threshold value of a total issued traffic usage; and sending total traffic usage information of the first session and the second session to the first policy control function and the second policy control function in response to that the current total traffic usage reaches the threshold value of the total issued traffic usage, so that the first policy control function and the second policy control function perform policy control according to the total traffic usage information and respective accumulated traffic usage increment information, and repeating above steps in response to that the current total traffic usage does not reach the threshold value of the total issued traffic usage.

The present disclosure further provides a server, including a memory and a processor, where the memory stores a program for monitoring and controlling session traffic usage, which is operable on the processor, and the processor is configured to execute the program stored in the memory to implement steps of: receiving traffic usage increment information of a first session and traffic usage increment information of a second session reported by a first policy control function and a second policy control function; accumulating a total traffic usage of the first session and the second session according to the received traffic usage increment information; determining whether a current total traffic usage reaches a threshold value of a total issued traffic usage; and sending total traffic usage information of the first session and the second session to the first policy control function and the second policy control function in response to that the current total traffic usage reaches the threshold value of the total issued traffic usage, so that the first policy control function and the second policy control function perform policy control according to the total traffic usage information and respective accumulated traffic usage increment information, and repeating above steps in response to that the current total traffic usage does not reach the threshold value of the total issued traffic usage.

The present disclosure further provides a computer-readable storage medium storing one or more programs containing executable instructions, where the programs are executed by one or more processors to implement the above-mentioned method for monitoring and controlling session traffic usage.

DETAILED DESCRIPTION

Functions, features and advantages of the technical solutions of the present disclosure will be described below with reference to the accompanying drawings.

It should be understood that the following embodiments and implementations are merely illustrative of the technical solutions of the present disclosure, and the present disclosure is not limited thereto.

Figure 1:
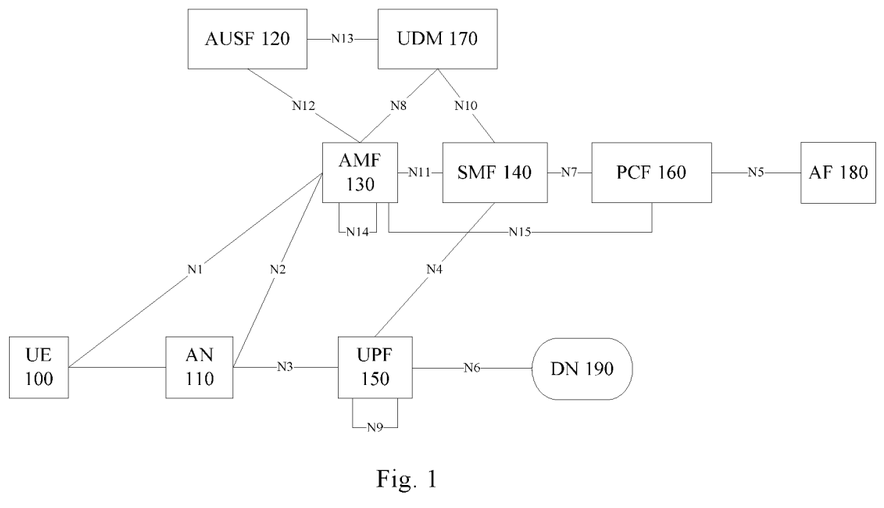
FIG. 1 is an architecture diagram of a 5G system.

FIG. 1 shows an architecture diagram of a 5G system upon which an embodiment of the present disclosure is based. As shown in FIG. 1, the 5G system includes an Access Network (AN) 110, an Authentication Server Function (AUSF) 120, an Access and Mobility Management Function (AMF) 130, a Session Management Function (SMF) 140, a User Plane Function (UPF) 150, a Policy Control Function (PCF) 160, a Unified Data Manager (UDM) 170, an Application Function (AF) 180, and a Data Network (Data Network, DN) 190. The PCF is configured to provide a 5G QoS policy to the SMF, control the AMF, and provide a routing policy to a User Equipment (UE) 100 via the AMF. For example, an access network discovery and selection policy may be provided to the UE through an integrated Access Network Discovery and Selection Function (ANDSF).

As defined in the 3rd Generation Partnership Project (3GPP) TS 23.501, the PCF may read policy-related user subscription information from a User Data Repository (UDR), the UDR may send a user subscription change notification to the PCF, and the PCF may report policy control-related information, including session traffic usage information of the user, to the UDR.

Embodiments of the present disclosure are implemented based on the 5G system shown in FIG. 1.

Figure 2:
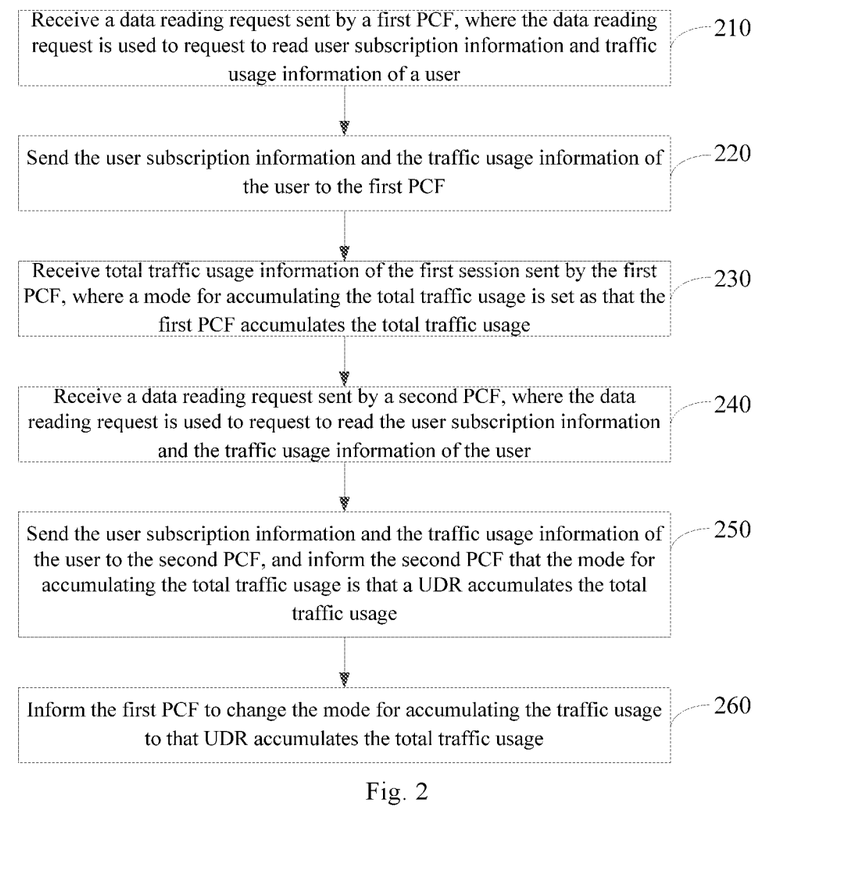
FIG. 2 is a schematic flowchart of a method for monitoring and controlling session traffic usage according to an embodiment of the present disclosure.

FIG. 2 shows a schematic flowchart of a method for monitoring and controlling session traffic usage according to an embodiment of the present disclosure. As shown in FIG. 2, the method for monitoring and controlling session traffic usage according to the embodiment of the present disclosure is applied to the UDR, and includes the following steps 210 to 260.

In step 210, a data reading request sent by a first PCF is received, where the data reading request is used to request to read user subscription information and traffic usage information of a user.

When a first session of the user is distributed to the first PCF, a data reading request sent by the first PCF for requesting to read the user subscription information and the traffic usage information of the user is received during the first session.

In step 220, the user subscription information and the traffic usage information of the user are sent to the first PCF.

The first PCF may perform policy control according to the read user subscription information and the traffic usage information of the user.

In step 230, total traffic usage information of the first session sent by the first PCF is received, where a mode for accumulating the total traffic usage is set as that the first PCF accumulates the total traffic usage.

Since there is only one session of the user and the session is distributed to the first PCF, the total traffic usage of the first session accumulated by the first PCF is used as the total traffic usage of the user.

It should be noted that the first PCF may report the total traffic usage information of the first session at predetermined time intervals (e.g., once every half an hour), so that the UDR can back up the total traffic usage information of the first session, to avoid that the first PCF loses the total traffic usage information of the first session due to breakdown of the first PCF, and the UDR can update the total traffic usage information of the first session in time for enquiry, and the like.

It should be understood that the predetermined time intervals may be set as needed, and the present disclosure is not limited thereto.

In some implementations, the traffic usage of the user may be represented by an elapsed duration of the session.

In step 240, a data reading request sent by a second PCF is received, where the data reading request is used to request to read the user subscription information and the traffic usage information of the user.

When a second session of the user is distributed to the second PCF, a data reading request sent by the second PCF for requesting to read the user subscription information and the traffic usage information of the user is received during the second session.

In the embodiment, the first session and the second session refer to PDU sessions, and may be sessions established through an application (e.g., chat software, browser, video software, etc.).

In step 250, the user subscription information and the traffic usage information of the user is sent to the second PCF, and the second PCF is informed that the mode for accumulating the total traffic usage is that a UDR accumulates the total traffic usage.

In step 260, the first PCF is informed to change the mode for accumulating the traffic usage to that UDR accumulates the total traffic usage.

The second PCF carries out policy control according to the user subscription information and the traffic usage information of the user.

Since there are two sessions in the system at this time, the mode for accumulating the total traffic usage is that UDR accumulates the total traffic usage. Those skilled in the art will appreciate that, in some implementations, the number of sessions in the system may also be three, four, . . . , etc., and as long as the number of sessions is greater than one, the mode for accumulating the total traffic usage is that UDR accumulates the total traffic usage.

Figure 3:
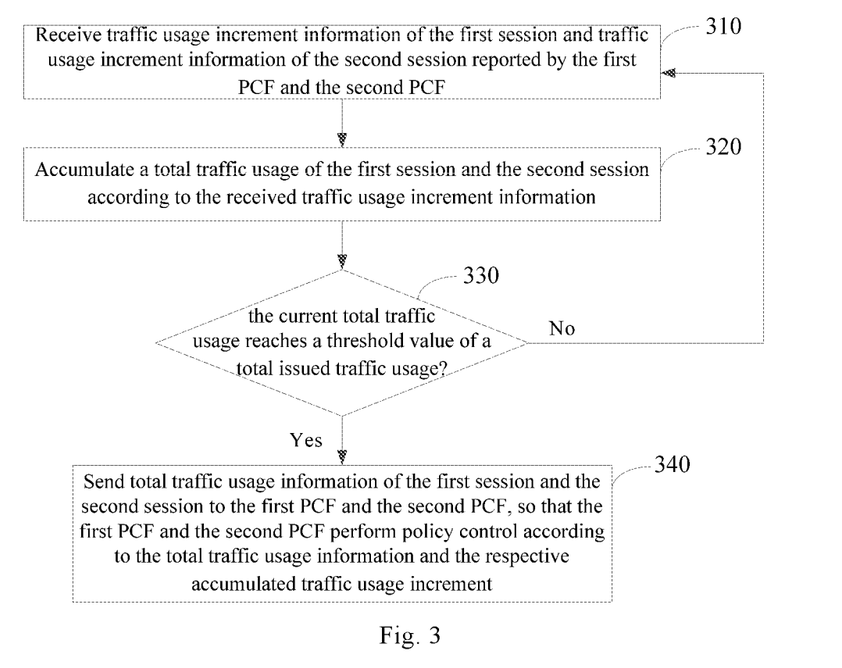
FIG. 3 is a schematic flowchart of a method for monitoring and controlling session traffic usage according to an embodiment of the present disclosure.

In some implementations, as shown in FIG. 3, the method for monitoring and controlling session traffic usage according to the embodiment of the present disclosure may further include the following steps 310 to 340 after the step 260.

In step 310, traffic usage increment information of the first session and traffic usage increment information of the second session reported by the first PCF and the second PCF are received.

The first PCF accumulates the traffic usage increment of the first session, and reports the traffic usage increment information of the first session when the traffic usage increment reaches a preset reporting threshold. The second PCF accumulates the traffic usage increment of the second session, and reports the traffic usage increment information of the second session when the traffic usage increment reaches the preset reporting threshold. For example, the reporting threshold preset by the PCF may be 5M, and as long as a traffic usage increment of a PDU session reaches 5M, the corresponding PCF reports the traffic usage increment information of 5M.

It should be understood that different PCFs may set a same reporting threshold, or may set different reporting thresholds.

In step 320, a total traffic usage of the first session and the second session according to the received traffic usage increment information are accumulated.

The current total traffic usage may be obtained by accumulating traffic usage increments reported by the first PCF and the second PCF on an original total traffic usage.

In step 330, it is determined whether the current total traffic usage reaches a threshold value of a total issued traffic usage, enter step 340 in response to that the current total traffic usage reaches the threshold value of the total issued traffic usage, and return to step 310 so as to repeatedly perform steps 310 to 330 in response to that the current total traffic usage does not reach the threshold value of the total issued traffic usage.

The threshold value of the total issued traffic usage may be preset by the UDR, or may be subscribed from the UDR by the PCF.

If the threshold value of the total issued traffic usage is subscribed from the UDR by the PCF, the PCF subscribes for a notification of the threshold value of the total traffic usage of each PCF from the UDR according to user subscription information.

In step 340, total traffic usage information of the first session and the second session is sent to the first PCF and the second PCF, so that the first PCF and the second PCF perform policy control according to the total traffic usage information and the respective accumulated traffic usage increment.

If the current total traffic usage reaches the threshold value of the total issued traffic usage, the total traffic usage information is sent to the first PCF and the second PCF to inform the first PCF and the second PCF that policy control needs to be applied to the corresponding session, for example, the PDU transmission speed of the corresponding session requires to be controlled.

If the current total traffic usage does not reach the threshold value of the total issued traffic usage, the process returns to step 310, so that the first PCF accumulates the traffic usage increment of the first session again, when the traffic usage increment reaches the preset reporting threshold, the traffic usage increment information of the first session is reported, the second PCF accumulates the traffic usage increment of the second session again, and when the traffic usage increment reaches the preset reporting threshold, the traffic usage increment information of the second session is reported.

The above steps 310 to 340 may be executed circularly until the PDU session is ended.

In the method for monitoring and controlling session traffic usage, traffic usage increment information of a first session and traffic usage increment information of a second session, which are reported by a first PCF and a second PCF, are received, a total traffic usage of the first session and the second session is accumulated according to the received traffic usage increment information, and when it is determined that the total traffic usage reach a threshold value of a total issued traffic usage, total traffic usage information of the first session and the second session is sent to the first PCF and the second PCF, so that the first PCF and the second PCF perform policy control according to the total traffic usage information and the respective accumulated traffic usage increment information. Therefore, by using the method for monitoring and controlling session traffic usage according to the embodiment, the total session traffic usage of the user can be obtained in a case where the user distributes sessions to a plurality of PCFs, and the timeliness and the accuracy of the policy control are improved.

Figure 4:
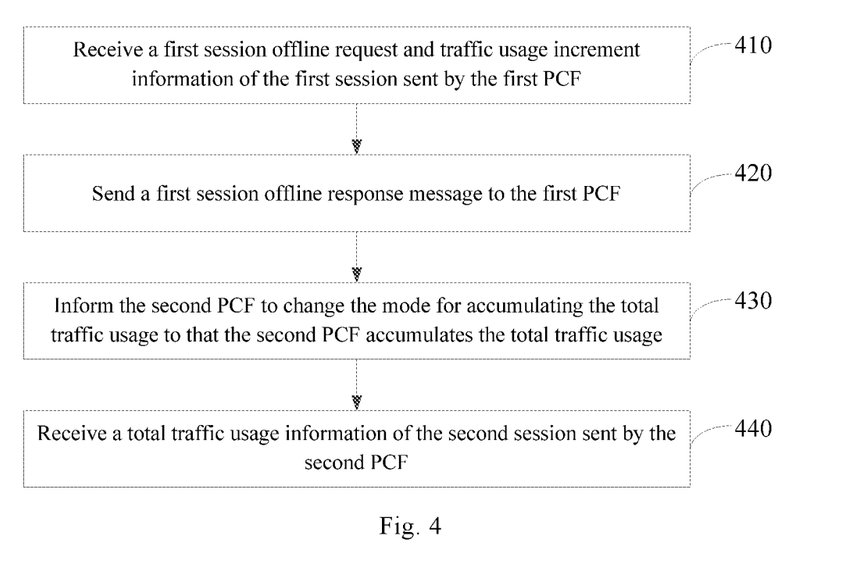
FIG. 4 is a schematic flowchart of a method for monitoring and controlling session traffic usage according to an embodiment of the present disclosure.

In some implementations, as shown in FIG. 4, a method for monitoring and controlling session traffic usage according to an embodiment of the present disclosure includes the following steps 410 to 440.

In step 410, a first session offline request and traffic usage increment information of the first session sent by the first PCF are received.

When the first session corresponding to the first PCF is ended, a first session offline request and traffic usage increment information of the first session sent by the first PCF are received.

In step 420, a first session offline response message is sent to the first PCF.

In step 430, the second PCF is informed to change the mode for accumulating the total traffic usage to that the second PCF accumulates the total traffic usage.

After the first session is offline, only the second session is online in the system, so the second PCF is informed to adjust the mode for accumulating the total traffic usage from that the UDR accumulates the total traffic usage to that the second PCF accumulates the total traffic usage.

In step 440, a total traffic usage information of the second session sent by the second PCF is received.

Since there is only one session of the user and the session is distributed to the second PCF, the total traffic usage of the second session accumulated by the second PCF is used as the total traffic usage of the user.

It should be noted that the second PCF may report the total traffic usage information of the second session at predetermined time intervals (e.g., once every half an hour), so that the UDR can back up the total traffic usage information of the second session, to avoid that the second PCF loses the total traffic usage information of the second session due to breakdown of the second PCF, and the UDR can update the total traffic usage information of the second session in time for enquiry, and the like.

It should be understood that the predetermined time intervals may be set as needed, and the present disclosure is not limited thereto.

In addition, the predetermined time intervals for the first PCF and the predetermined time intervals for the second PCF may be the same or different, which is not specifically limited by the present disclosure.

Figure 5:
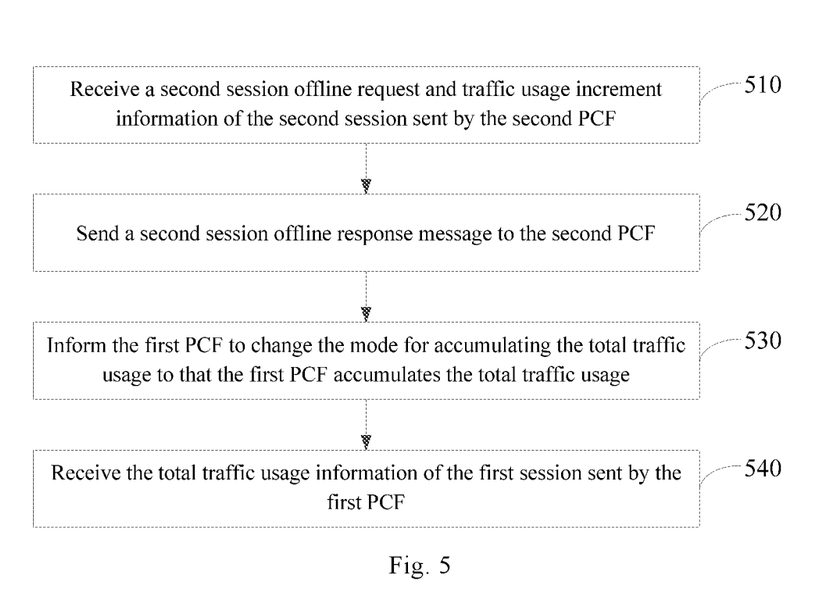
FIG. 5 is a schematic flowchart of a method for monitoring and controlling session traffic usage according to an embodiment of the present disclosure.

In some implementations, as shown in FIG. 5, a method for monitoring and controlling session traffic usage according to an embodiment of the present disclosure includes the following steps 510 to 540.

In step 510, a second session offline request and traffic usage increment information of the second session sent by the second PCF are received.

When the first session corresponding to the first PCF continues and the second session corresponding to the second PCF ends, a second session offline request and traffic usage increment information of the second session sent by the second PCF are received.

In step 520, a second session offline response message is sent to the second PCF.

In step 530, the first PCF is informed to change the mode for accumulating the total traffic usage to that the first PCF accumulates the total traffic usage.

After the second session is offline, only the first session is online in the system, so the first PCF is informed to adjust the mode for accumulating the total traffic usage from that the UDR accumulates the total traffic usage to that the first PCF accumulates the total traffic usage.

In step 540, the total traffic usage information of the first session sent by the first PCF is received.

Since there is only one session of the user and the session is distributed to the first PCF, the total traffic usage of the first session accumulated by the first PCF is used as the total traffic usage of the user. The first PCF may report the total traffic usage information of the first session at predetermined time intervals (e.g., once every half an hour), so that the UDR can back up the total traffic usage information of the first session, to avoid that the first PCF loses the total traffic usage information of the first session due to breakdown of the first PCF, and the UDR can update the total traffic usage information of the first session in time for enquiry.

It should be understood that, after step 440 or step 540, the process may return to step 210 as needed to repeat the flow shown in FIG. 2, and policy control of the PCF on the corresponding session is finally achieved.

In the method for monitoring and controlling session traffic usage according to the embodiment, when the first session ends, a first session offline request and traffic usage increment information of the first session sent by the first PCF are received, a first session offline response message is sent to the first PCF, the second PCF is informed to change the mode for accumulating the total traffic usage to that the second PCF accumulates the total traffic usage, and the total traffic usage information of the second session sent by the second PCF is received; when the second session ends, a second session offline request and traffic usage increment information of the second session sent by the second PCF are received, a second session offline response message is sent to the second PCF, the first PCF is informed to change the mode for accumulating the total traffic usage to that the first PCF accumulates the total traffic usage, and the total traffic usage information of the first session sent by the first PCF is received. Therefore, by using the method for monitoring and controlling session traffic usage according to the embodiment, the mode for accumulating the total traffic usage may be adjusted in real time according to the online situation of the sessions, and policy control can be performed more timely and effectively according to the traffic usage information.

Figure 6:
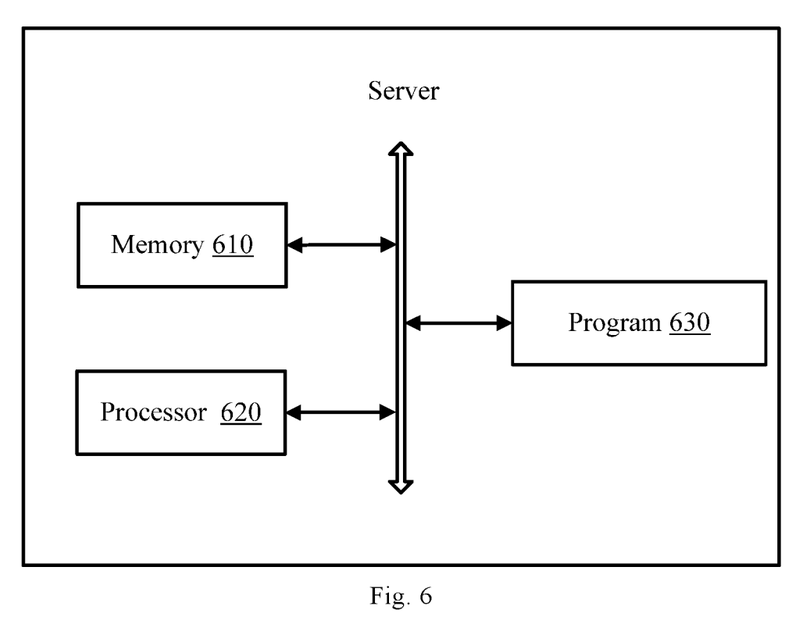
FIG. 6 is a schematic diagram of a hardware architecture of a server of an embodiment of the present disclosure.
Figure 7:
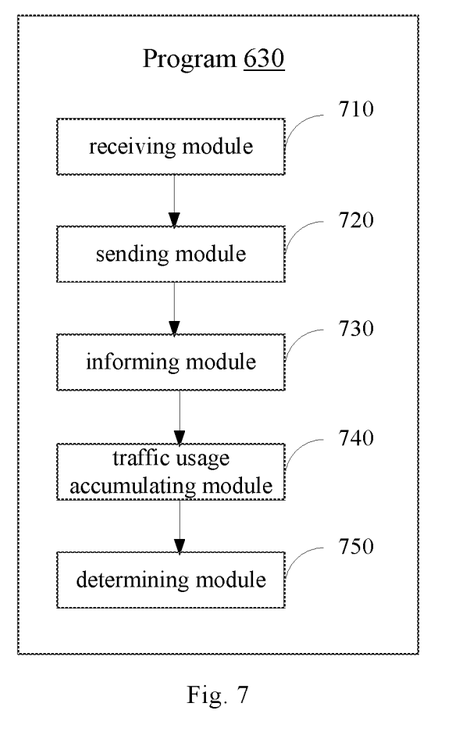
FIG. 7 is a block diagram of a server of an embodiment of the present disclosure.

FIG. 6 shows a schematic diagram of a hardware architecture of a server of an embodiment of the present disclosure. As shown in FIG. 6, the server of the embodiment of the present disclosure includes a memory 610, a processor 620, and a program 630 for monitoring and controlling session traffic usage stored on the memory 610 and operable on the processor 620. In the present embodiment, the program 630 for monitoring and controlling session traffic usage includes a series of computer program instructions stored on the memory 610, which when executed by the processor 620, can implement the method for monitoring and controlling session traffic usage according to the embodiment of the present disclosure. In some implementations, the program 630 for monitoring and controlling session traffic usage may be divided into one or more modules based on particular operations implemented by the computer program instructions. As shown in FIG. 7, the program 630 for monitoring and controlling session traffic usage may include a receiving module 710, a sending module 720, an informing module 730, a traffic usage accumulating module 740, and a determining module 750.

The receiving module 710 is configured to receive a data reading request sent by the first PCF, where the data reading request is used to request to read user subscription information and traffic usage information of a user.

When a first session of the user is distributed to the first PCF, during the first session, the receiving module 710 receives a data reading request sent by the first PCF for requesting to read the user subscription information and the traffic usage information of the user.

The sending module 720 is configured to send the user subscription information and the traffic usage information of the user to the first PCF.

The first PCF may perform policy control according to the user subscription information and the traffic usage information of the user.

The receiving module 710 is further configured to receive total traffic usage information of the first session sent by the first PCF, where a mode for accumulating the total traffic usage is set as that the first PCF accumulates the total traffic usage.

Since there is only one session of the user and the session is distributed to the first PCF, the total traffic usage of the first session accumulated by the first PCF is used as the total traffic usage of the user.

It should be noted that the first PCF may report the total traffic usage information of the first session at predetermined time intervals (e.g., once every half an hour), so that the UDR can back up the total traffic usage information of the first session, to avoid that the first PCF loses the total traffic usage information of the first session due to breakdown of the first PCF, and the UDR can update the total traffic usage information of the first session in time for enquiry.

It should be understood that the predetermined time intervals may be set as needed, and the present disclosure is not limited thereto.

In some implementations, the traffic usage of the user may be represented by an elapsed duration of the session.

When a second session of the user is distributed to the second PCF, during the second session, the receiving module 710 is further configured to receive a data reading request sent by the second PCF, where the data reading request is used to request to read the user subscription information and the traffic usage information of the user.

In the embodiment, the first session and the second session refer to PDU sessions, and may be sessions to be established through an application (e.g., chat software, browser, video software, etc.).

Correspondingly, the sending module 720 is further configured to send the user subscription information and the traffic usage information of the user to the second PCF, and inform the second PCF that the mode for accumulating the total traffic usage is that UDR accumulates the total traffic usage.

The informing module 730 is configured to inform the first PCF to change the mode for accumulating the total traffic usage to that UDR accumulates the total traffic usage.

The second PCF carries out policy control according to the user subscription information and the traffic usage information of the user.

Since there are two sessions in the system at this time, the mode for accumulating the total traffic usage is that UDR accumulates the total traffic usage. Those skilled in the art will appreciate that, in some implementations, the number of sessions in the system may also be three, four, . . . , etc., and as long as the number of sessions is greater than one, the mode for accumulating the total traffic usage is that UDR accumulates the total traffic usage.

In some implementations, the receiving module 710 is further configured to receive traffic usage increment information of the first session and traffic usage increment information of the second session, which are reported by the first PCF and the second PCF.

The first PCF accumulates the traffic usage increment of the first session, and reports the traffic usage increment information of the first session when the traffic usage increment reaches a preset reporting threshold. The second PCF accumulates the traffic usage increment of the second session, and reports the traffic usage increment information of the second session when the traffic usage increment reaches the preset reporting threshold. For example, the reporting threshold preset by the PCF may be 5M, and as long as a traffic usage increment of a PDU session reaches 5M, the corresponding PCF reports the traffic usage increment information of 5M.

It should be understood that different PCFs may set a same reporting threshold, or may set different reporting thresholds.

The traffic usage accumulating module 740 is configured to accumulate the total traffic usage of the first session and the second session according to the received traffic usage increment information.

The current total traffic usage may be obtained by accumulating traffic usage increments reported by the first PCF and the second PCF on an original total traffic usage.

The determining module 750 is configured to determine whether the current total traffic usage reaches a threshold value of a total issued traffic usage, in response to that the current total traffic usage reaches the threshold value of the total issued traffic usage, the sending module 720 is triggered to send the total traffic usage information of the first session and the second session to the first PCF and the second PCF, so that the first PCF and the second PCF perform policy control according to the total traffic usage information and the respective accumulated traffic usage increment, and in response to that the current total traffic usage does not reach the threshold value of the total issued traffic usage, the receiving module 710 is triggered to receive the traffic usage increment information of the first session and the traffic usage increment information of the second session reported by the first PCF and the second PCF again.

The threshold value of the total issued traffic usage may be preset by the UDR, or may be subscribed from the UDR by the PCF.

If the threshold value of the total issued traffic usage is subscribed from the UDR by the PCF, the PCF subscribes for a notification of the threshold value of the total traffic usage of each PCF from the UDR according to user subscription information.

If the current total traffic usage reaches the threshold value of the total issued traffic usage, the sending module 720 sends the total traffic usage information to the first PCF and the second PCF, so as to inform the first PCF and the second PCF that policy control needs to be applied to the corresponding session, for example, the PDU transmission speed of the corresponding session requires to be controlled.

If the current total traffic usage does not reach the threshold value of the total issued traffic usage, the receiving module 710 receives the traffic usage increment information of the first session and the traffic usage increment information of the second session reported by the first PCF and the second PCF again.

The receiving module 710 is further configured to receive a first session offline request and traffic usage increment information of the first session sent by the first PCF, or receive a second session offline request and traffic usage increment information of the second session sent by the second PCF.

When the first session corresponding to the first PCF is ended, a first session offline request sent by the first PCF and traffic usage increment information of the first session are received.

When the first session corresponding to the first PCF continues and the second session corresponding to the second PCF ends, a second session offline request sent by the second PCF and traffic usage increment information of the second session are received.

The sending module 720 is further configured to send a first session offline response message to the first PCF or a second session offline response message to the second PCF.

The informing module 730 is further configured to inform the second PCF to change the mode for accumulating the total traffic usage to that the second PCF accumulates the total traffic usage, or inform the first PCF to change the mode for accumulating the total traffic usage to that the first PCF accumulates the total traffic usage.

When only the second session is online in the system, the second PCF is informed to adjust the mode for accumulating the total traffic usage from that the UDR accumulates the total traffic usage to that the second PCF accumulates the total traffic usage.

When only the first session is online in the system, the first PCF is informed to adjust the mode for accumulating the total traffic usage from that the UDR accumulates the total traffic usage to that the first PCF accumulates the total traffic usage.

The receiving module 710 is further configured to receive total traffic usage information of the second session sent by the second PCF, or receive total traffic usage information of the first session sent by the first PCF.

When the first session is ended, only one session of the user exists, and the session is distributed to the second PCF, thus the total traffic usage of the second session accumulated by the second PCF is used as the total traffic usage of the user.

It should be noted that the second PCF may report the total traffic usage information of the second session at predetermined time intervals (e.g., once every half an hour), so that the UDR can back up the total traffic usage information of the second session, so as to avoid that the second PCF loses the total traffic usage information of the second session due to breakdown of the second PCF, and the UDR can update the total traffic usage information of the second session in time for enquiry.

When the second session is ended, only one session of the user exists, and the session is distributed to the first PCF, thus the total traffic usage of the first session accumulated by the first PCF is used as the total traffic usage of the user.

It should be noted that the first PCF may report the total traffic usage information of the first session at predetermined time intervals (e.g., once every half an hour), so that the UDR can back up the total traffic usage information of the first session, to avoid that the first PCF loses the total traffic usage information of the first session due to breakdown of the first PCF, and the UDR can update the total traffic usage information of the first session in time for enquiry.

It should be understood that the predetermined time intervals may be set as needed, and the present disclosure is not limited thereto.

In addition, the predetermined time intervals for the first PCF and the predetermined time intervals for the second PCF may be the same or different, which is not specifically limited by the present disclosure.

In the server provided in the embodiment, the receiving module 710 receives the traffic usage increment information of the first session and the traffic usage increment information of the second session reported by the first PCF and the second PCF, the traffic usage accumulating module 740 accumulates the total traffic usage of the first session and the second session according to the received traffic usage increment information, and when the determining module 750 determines that the total traffic usage reaches the threshold value of the total issued traffic usage, the sending module 720 sends the total traffic usage information of the first session and the second session to the first PCF and the second PCF, so that the first PCF and the second PCF perform policy control according to the total traffic usage information and the respective accumulated traffic usage increment information. Therefore, by using the server of the embodiment, the total session traffic usage of the user can be obtained in a case where the user distributes sessions to a plurality of PCFs, and the timeliness and the accuracy of the policy control are improved. In addition, in the server provided in the embodiment, the mode for accumulating the total traffic usage may be adjusted in real time according to the online situation of the sessions, and policy control can be performed more timely and effectively according to the traffic usage information.

An embodiment of the present disclosure further provides a computer-readable storage medium. The computer-readable storage medium stores one or more programs. The computer-readable storage medium may include volatile memory (e.g., random access memory), non-volatile memory (e.g., read-only memory, flash memory, a hard disk, or a solid state disk), or a combination of the above. The program stored in the computer-readable storage medium is executable by one or more processors to implement the method for monitoring and controlling session traffic usage according to the embodiments of the present disclosure.

It should be noted that, in practical applications, the "module" in the present disclosure may be implemented by software, hardware or a combination thereof, and the hardware is, for example, a processor or an integrated circuit.

It should be noted that the term "includes/including" or any variation thereof in the present disclosure is intended to cover a non-exclusive inclusion, such that a method or article including a list of elements does not include only the listed elements but may include other elements not expressly listed or inherent to such method or article. Without further limitation, an element defined by the phrase "including . . . ." does not exclude the presence of additional elements in a method or article including the element.

The embodiments and implementations of the present disclosure have been described in conjunction with the drawings, but the present disclosure is not limited to the embodiments and implementations, which are only illustrative and not restrictive, and those skilled in the art can make various changes or modifications without departing from the spirit of the present disclosure, and all such changes or modifications are deemed to be within the scope of the present disclosure.

What is claimed is:

1. A method for monitoring and controlling session traffic usage, comprising:
    receiving traffic usage increment information of a first session and traffic usage increment information of a second session reported by a first policy control function and a second policy control function;
    accumulating a total traffic usage of the first session and the second session according to the received traffic usage increment information;
    determining whether a current total traffic usage reaches a threshold value of a total issued traffic usage; and
    in response to that the current total traffic usage reaches the threshold value of the total issued traffic usage, sending total traffic usage information of the first session and the second session to the first policy control function and the second policy control function, so that the first policy control function and the second policy control function carry out policy control according to the total traffic usage information and the respective accumulated traffic usage increment information, and in response to that the current total traffic usage does not reach the threshold value of the total issued traffic usage, repeating above steps.

2. The method according to claim 1, further comprising:
    before receiving the traffic usage increment information of the first session and the traffic usage increment information of the second session reported by the first policy control function and the second policy control function, receiving a data reading request sent by the first policy control function, wherein the data reading request is used for requesting to read user subscription information and traffic usage information of a user;
    sending the user subscription information and the traffic usage information of the user to the first policy control function; and
    receiving the total traffic usage information of the first session sent by the first policy control function, wherein a mode for accumulating the total traffic usage is set as that the first policy control function accumulates the total traffic usage.

3. The method according to claim 2, further comprising:
    receiving a data reading request sent by the second policy control function, wherein the data reading request is used for requesting to read the user subscription information and the traffic usage information of the user;
    sending the user subscription information and the traffic usage information of the user to the second policy control function, and informing the second policy control function that the mode for accumulating the total traffic usage is that a user data repository accumulates the total traffic usage; and
    informing the first policy control function to change the mode for accumulating the total traffic usage to that the user data repository accumulates the total traffic usage.

4. The method according to claim 1, further comprising:
    receiving a first session offline request and traffic usage increment information of the first session sent by the first policy control function;
    sending a first session offline response message to the first policy control function;
    informing the second policy control function to change the mode for accumulating the total traffic usage to that the second policy control function accumulates the total traffic usage; and
    receiving the total traffic usage information of the second session sent by the second policy control function.

5. The method according to claim 1, further comprising:
    receiving a second session offline request and traffic usage increment information of the second session sent by the second policy control function;
    sending a second session offline response message to the second policy control function;
    informing the first policy control function to change the mode for accumulating the total traffic usage to that the first policy control function accumulates the total traffic usage; and receiving the total traffic usage information of the first session sent by the first policy control function.

6. A server, comprising a memory and a processor, the memory having stored thereon a program for monitoring and controlling session traffic usage and operable on the processor, the processor configured to execute the program stored in the memory to implement:
receiving traffic usage increment information of a first session and traffic usage increment information of a second session reported by a first policy control function and a second policy control function;
accumulating a total traffic usage of the first session and the second session according to the received traffic usage increment information;
determining whether a current total traffic usage reaches a threshold value of a total issued traffic usage; and
in response to that the current total traffic usage reaches the threshold value of the total issued traffic usage, sending total traffic usage information of the first session and the second session to the first policy control function and the second policy control function, so that the first policy control function and the second policy control function carry out policy control according to the total traffic usage information and the respective accumulated traffic usage increment information, and in response to that the current total traffic usage does not reach the threshold value of the total issued traffic usage, repeating above steps.

7. The server according to claim 6, wherein the processor is further configured to execute the program stored in the memory to implement:
before receiving the traffic usage increment information of the first session and the traffic usage increment information of the second session reported by the first policy control function and the second policy control function, receiving a data reading request sent by the first policy control function, wherein the data reading request is used for requesting to read user subscription information and traffic usage information of a user;
sending the user subscription information and the traffic usage information of the user to the first policy control function; and
receiving the total traffic usage information of the first session sent by the first policy control function, wherein a mode for accumulating the total traffic usage is set as that the first policy control function accumulates the total traffic usage.

8. The server according to claim 7, wherein the processor is further configured to execute the program stored in the memory to implement:
receiving a data reading request sent by the second policy control function, wherein the data reading request is used for requesting to read the user subscription information and the traffic usage information of the user;
sending the user subscription information and the traffic usage information of the user to the second policy control function, and informing the second policy control function that the mode for accumulating the total traffic usage is that a user data repository accumulates the total traffic usage; and
informing the first policy control function to change the mode for accumulating the total traffic usage to that the user data repository accumulates the total traffic usage.

9. The server according to claim 6, wherein the processor is further configured to execute the program stored in the memory to implement:
receiving a first session offline request and traffic usage increment information of the first session sent by the first policy control function;
sending a first session offline response message to the first policy control function;
informing the second policy control function to change the mode for accumulating the total traffic usage to that the second policy control function accumulates the total traffic usage; and
receiving the total traffic usage information of the second session sent by the second policy control function.

10. The server according to claim 6, wherein the processor is further configured to execute the program stored in the memory to implement:
receiving a second session offline request and traffic usage increment information of the second session sent by the second policy control function;
sending a second session offline response message to the second policy control function;
informing the first policy control function to change the mode for accumulating the total traffic usage to that the first policy control function accumulates the total traffic usage; and
receiving the total traffic usage information of the first session sent by the first policy control function.

11. A computer-readable storage medium storing one or more programs comprising executable instructions which, when executed by one or more processors, cause the one or more processors to perform the method of claim 1.

* * * * *